Patented Oct. 10, 1933

1,929,559

UNITED STATES PATENT OFFICE 1,929,559

PROCESS OF COATING AND PRODUCT THEREOF

William H. Moss, Cumberland, Md., assignor to Celanese Corporation of America, New York, N. Y., a corporation of Delaware No Drawing. Application October 12, 1927
Serial No. 255,856

3 Claims. (Cl. 91—68)

This invention relates to the method of applying lacquer containing organic derivatives of cellulose to metallic or other smooth surfaces.

An object of this invention is to provide a method of applying lacquer or solutions containing organic derivatives of cellulose and particularly cellulose acetate to metallic surfaces, which laquer on drying leaves clear, hard, firmly adhering and light-fast films. Other objects of my invention will appear from the following detailed description.

While the advantages of lacquer containing organic derivatives of cellulose and particularly cellulose acetate have been long recognized, their application on smooth surfaces such as metal, glass or hardwood has heretofore been impractical because of the fact that when such lacquers are applied to smooth surfaces, the film formed on drying does not adhere to such surfaces and is therefore easily peeled off.

I have found that while lacquer containing an organic derivative of cellulose, such as cellulose acetate, as substantially the only constituent of the lacquer base cannot be used to produce a film that adheres to hard, smooth surfaces, such lacquer may be applied to a film formed from a lacquer or varnish that is adherent to such smooth surfaces and to which a film formed from a lacquer containing such organic derivatives of cellulose as substantially the only constituent of the lacquer base will adhere.

In accordance with my invention the hard, smooth surfaces such as iron, glass or hardwood is first coated with a lacquer or varnish that forms films that adhere to such surfaces and to which in turn a film formed from a lacquer containing cellulose acetate will adhere. Various lacquers or varnishes meet this requirement. Lacquers containing organic esters of cellulose and synthetic resins, such as the soluble and fusible resins formed by the condensation of phenols and aldehydes in the presence of basic or acidic catalysts, but preferably acidic catalysts as set forth in my application No. 217,536 filed Sept. 3, 1927 may be used for this purpose. Also lacquers containing diphenylol propane (acetone-phenol) resins and organic esters of cellulose as set forth in my application No. 230,186 filed Oct. 31, 1927 may be used as the undercoat for the top cellulose acetate coat. Furthermore lacquers containing dark synthetic resins or light synthetic resins together with dark dyes or pigments as set forth in my application No. 243,474 filed Dec. 29, 1927 may also be used. Also lacquers containing resins produced by the condensation of diphenylol propane and acetone or of phenol and acetone as set forth in my application No. 227,870 filed Oct. 21, 1927 and resins produced from these resins by further condensation with formaldehyde as set forth in my application No. 227,871 filed Oct. 21, 1927 may be used as an undercoat.

I have also found that a lacquer containing any of the above mentioned synthetic resins and containing no organic derivatives of cellulose and preferably but not necessarily containing suitable plasticizers may be used as an undercoat. I have also found that cellulose ethers, such as methyl cellulose, ethyl cellulose or benzyl cellulose when mixed with suitable plasticizers and dissolved in suitable solvents produce lacquers that are adherent to smooth, hard surfaces and form a suitable undercoat for cellulose ester lacquers.

The lacquer or varnish that is used for the undercoat may be applied directly to the raw, smooth surface or it may be applied over an ordinary primer coat. This undercoat lacquer or varnish may be clear or it may have any desired pigment incorporated therein. One or more coats of this undercoat lacquer or varnish may be applied to the surface. After this undercoat lacquer has dried sufficiently, one, two, three or more coats of a lacquer containing organic derivatives of cellulose as substantially the whole of the lacquer base are applied. By organic derivatives of cellulose is meant cellulose ethers and more particularly organic esters of cellulose such as cellulose formate, cellulose acetate, cellulose butyrate and cellulose propionate or any mixtures thereof. The lacquer may be clear or it may contain any desired pigment. Obviously, it contains suitable solvents and plasticizers.

Both the undercoat lacquer and varnishes and the top coat containing organic derivatives of cellulose may be applied in any suitable manner such as by spraying, brushing, flowing, dipping, etc.

In order to further elucidate my invention the following specific examples of carrying out the same are given.

*Example 1*

A clear metallic surface either previously coated or not with a primer containing linseed oil, turpentine, resin and pigment has applied thereon an undercoat made by dissolving in a solvent made of 80 parts of acetone and 20 parts of tetrachlor ethane any of the following nonvolatile substances:

1. Resin formed by the condensation of acetone-phenol (diphenylol propane) and formaldehyde.

| | Percent |
|---|---|
| 2. Acetone-phenol-formaldehyde resin | 75 to 90 |
| Diethyl phthalate | 25 to 10 |
| 3. Acetone-phenol-formaldehyde resin | 60 |
| Cellulose acetate | 20 |
| Diethyl phthalate | 20 |

Approximately 25 parts of the above nonvolatile substances are dissolved in approximately 75 parts of suitable volatile solvent. After the undercoat has dried a top coat constituted as follows is applied.

| | Parts |
|---|---|
| Cellulose acetate | 80 |
| Diethyl phthalate | 20 |

Ten parts of the above nonvolatile substances are dissolved in a volatile solvent consisting of:

| | Parts |
|---|---|
| Acetone | 40 |
| Alcohol | 18 |
| Benzene | 22 |
| Tetrachlor ethane | 20 |

In the above illustrations any desired pigment may be incorporated in the undercoat and/or the top coat. The composite film thus obtained is clear if unpigmented, tough and will stick to the metallic surface.

Example 2

The metallic surface is first given a primer coat composed of linseed oil, turpentine, resin and pigment. It is then given three coats of lacquer, the first coat comprising cellulose acetate, plasticizer, pigment and resin; the second coat containing cellulose acetate, plasticizer and pigment; the third coat containing cellulose acetate and plasticizer. The first coat is made up as follows:

| | Percent |
|---|---|
| Cellulose acetate | 20 |
| Synthetic resin | 30 |
| Diethyl phthalate | 15 |
| Pigment | 35 |

The above nonvolatile material is dissolved in a solvent comprising acetone, alcohol, benzene and ethyl lactate. The synthetic resin may be an acetone-phenol-formaldehyde condensation product, a phenol-formaldehyde resin prepared in the presence of an acid catalyst or other synthetic resins as described in my applications No. 217,536 filed Sept. 3, 1927 and No. 230,186 filed Oct. 31, 1927. The pigment may be of any desired character one example being equal parts of Titanox (titanium oxide) and Chinese blue. The lacquer for the second coat is composed as follows:

| | Percent |
|---|---|
| Cellulose acetate | 57.1 |
| Diethyl phthalate | 14.3 |
| Pigment | 28.6 |

These are dissolved in the same solvent as used for the lacquer of the first coat. The pigment may be the same as above set forth. The lacquer for the third coat is composed as follows:

| | Percent |
|---|---|
| Cellulose acetate | 83.5 |
| Diethyl phthalate | 16.5 | dissolved in the same volatile solvent as set forth for the first coat. The film produced is tough, firmly adherent, light-fast and does not blush when immersed in water for a period of 16 to 24 hours. The first coat which contains the synthetic resin adheres to the metallic surface. The second coat, which contains pigments, is the main color coat and gives the finish the desired color and color-fastness and is uninfluenced by the color of the resins used in the undercoat and/or the light-fastness of said resins. The third coat imparts a desirable gloss to the film without the necessity of polishing or further finishing, which presents a great advantage over the lacquers now used which require the added operations of sandpapering or sand blasting and polishing.

It is to be understood that the foregoing specific description is given merely by way of illustration and that many variations may be made therein without departing from the spirit of the invention. Obviously the proportions of ingredients may be varied within large limits in order to meet the particular requirements of the use to which the lacquer is to be put. Care should be taken that the top coats be not too heavy lest the films formed will peel from the surface.

Furthermore, the number of coats of the various lacquers and of the lacquers containing only the cellulose acetate as a lacquer base may be varied at will. Any suitable plasticizer, such as triacetin, tricresyl phosphate, triphenyl phosphate, may be used instead of diethyl phthalate as the plasticizer. Likewise, any desirable low boiling solvent may be used. Further instead of ethyl lactate other high boilers such as diacetone alcohol, tetrachlor ethane, benzyl alcohol may be employed.

Having described my invention what I claim and desire to secure by Letters Patent is:

1. Process of coating a metallic surface comprising applying a film of coating composition consisting essentially of organic derivatives of cellulose and a synthetic resin and then applying a film of a resin free coating composition consisting of an organic derivative of cellulose.

2. Process in accordance with claim 1 wherein the organic derivatives of cellulose is cellulose acetate.

3. Articles having a metallic surface coated with a film consisting essentially of an acetone-phenol-formaldehyde resin and an organic derivative of cellulose, said layer being adherent to a smooth surface and also to a film of organic derivatives of cellulose, and a top layer free from resin and consisting essentially of cellulose acetate.

WILLIAM H. MOSS.